F. JEAN-BAPTISTE DAMAIZIN & J. PUJOS.
CHANGE SPEED GEARING.
APPLICATION FILED MAY 28, 1910.
1,050,522.
Patented Jan. 14, 1913.
2 SHEETS—SHEET 1.
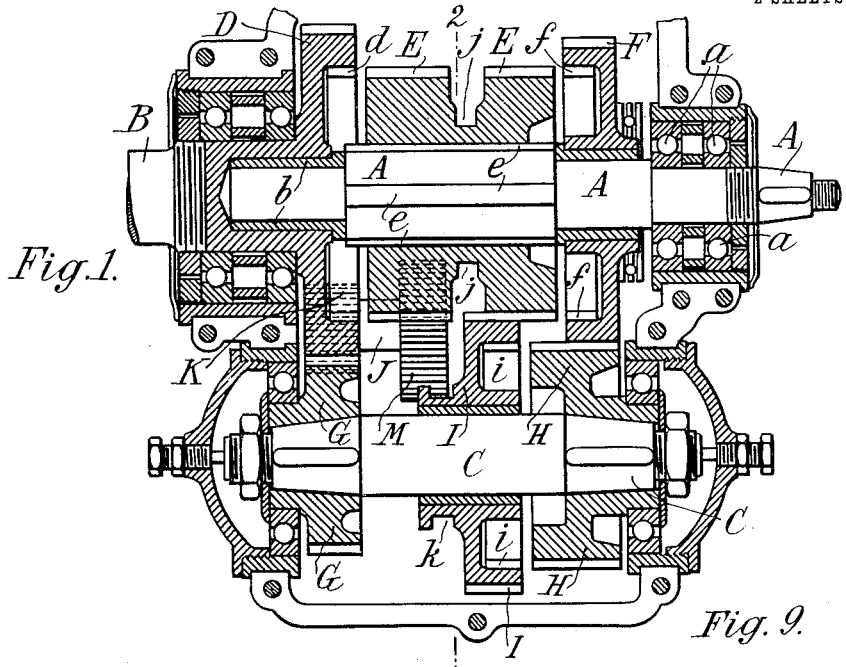
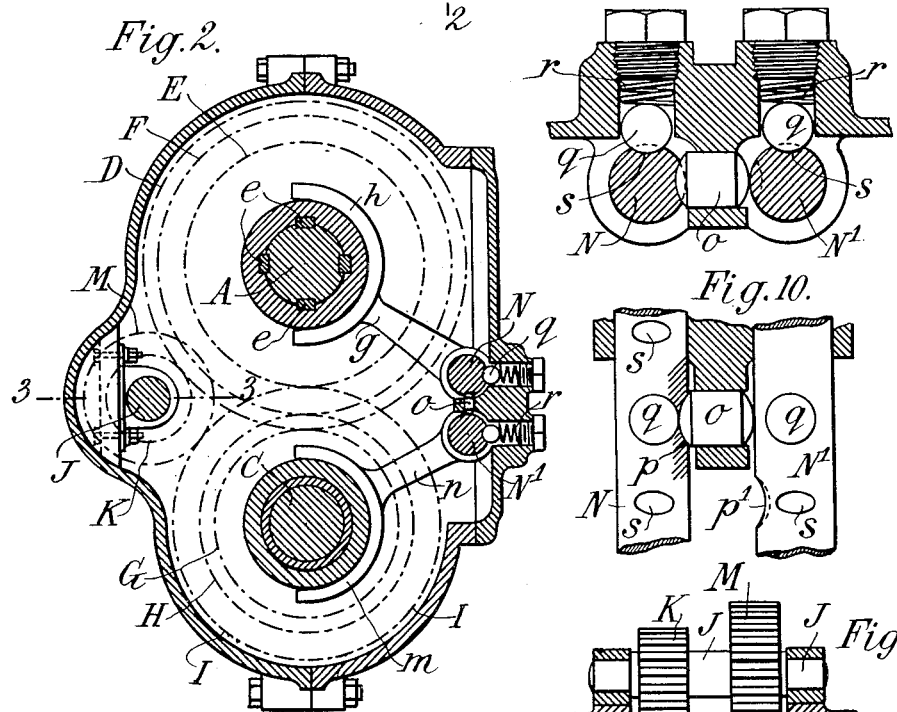
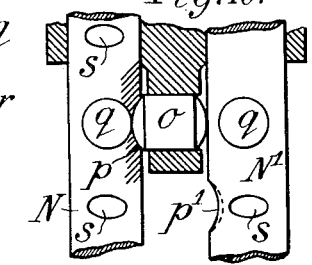
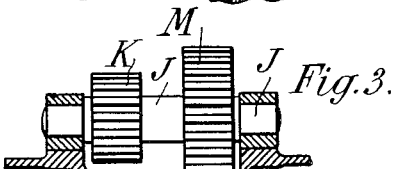
WITNESSES:
Rene Buine
William F. Martinez
INVENTORS,
Frédéric Jean Baptiste Damaizin
and Jean Pujos,
By Attorneys,

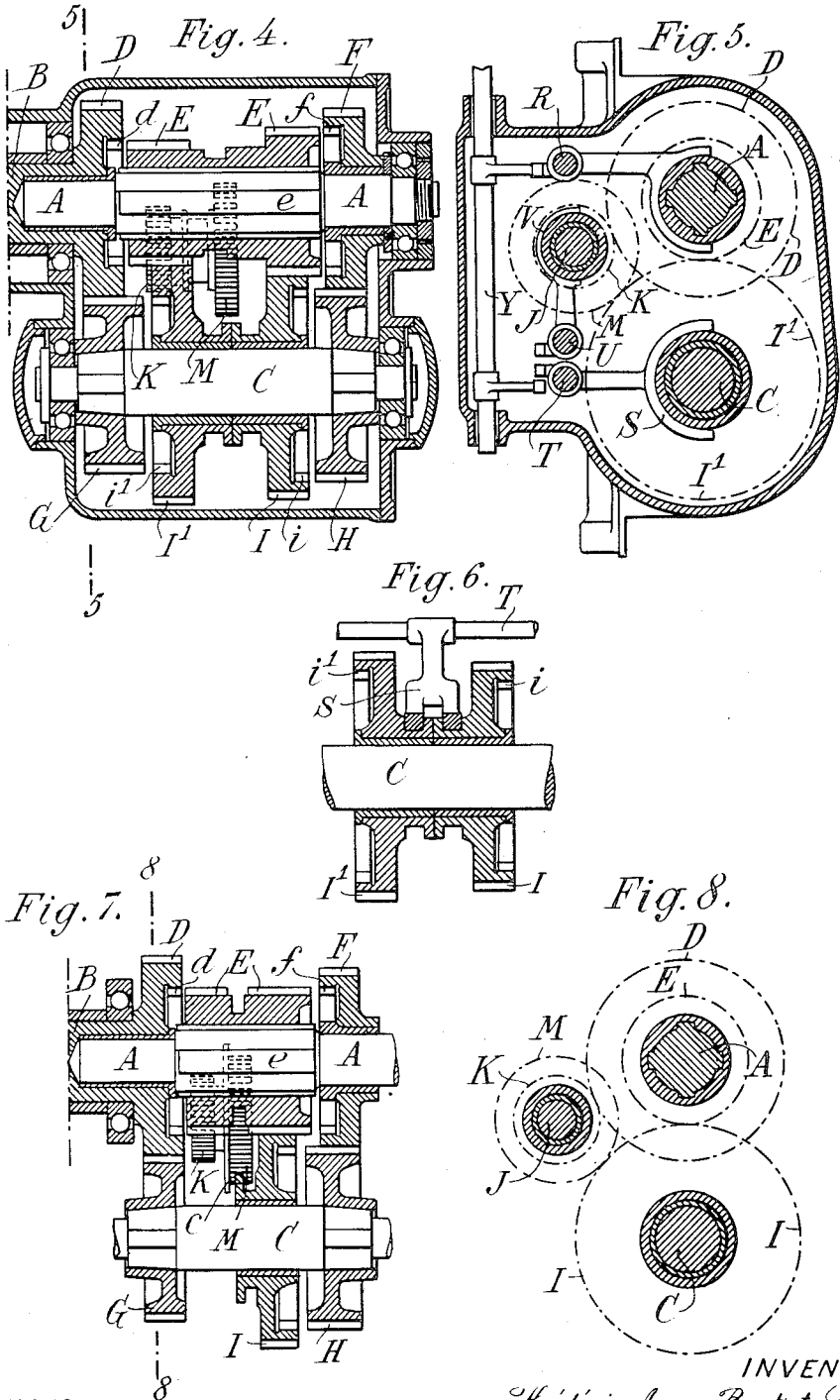

UNITED STATES PATENT OFFICE.

FREDERIC JEAN-BAPTISTE DAMAIZIN AND JEAN PUJOS, OF PARIS, FRANCE, ASSIGNORS, BY DIRECT AND MESNE ASSIGNMENTS, TO SOCIÉTÉ ANONYME L'EVOLUTION AUTOMOBILE (BREVETS D & P), OF PARIS, FRANCE.

CHANGE-SPEED GEARING.

1,050,522.  Specification of Letters Patent.  Patented Jan. 14, 1913.

Application filed May 28, 1910. Serial No. 563,842.

*To all whom it may concern:*

Be it known that we, FRÉDÉRIC JEAN-BAPTISTE DAMAIZIN and JEAN PUJOS, both citizens of the Republic of France, residing in Paris, France, have invented certain new and useful Improvements in Change-Speed Gearing, of which the following is a specification.

The change speed gearing which forms the subject matter of the present invention and is suitable for many applications, but particularly for motor cars, is so constructed that it occupies only a very small space being much reduced in length as compared with known gearing. It comprises within a casing two parallel shafts on which are mounted pinions by which different speeds may be attained, the pinions on the two shafts being constantly in engagement with each other. By suitably displacing one or another of these pinions, the transmission shaft can be driven directly or through intermediate speed-reducing gears. The intermediate gear wheels which transmit the movement of the motor shaft to the transmission shaft are also continuously in engagement and parts of the pinion on the motor shaft and a part of one of the pinions on the intermediate shaft act only as clutches for the purpose of driving the pinions. A third shaft, also contained in the casing, serves for backward running.

In the accompanying drawings Figure 1 is a horizontal section through the gearing; Fig. 2 is a cross section on line 2 2 of Fig. 1. Fig. 3 is a part longitudinal section on the line 3 3 of Fig. 2 showing the third shaft for backward running. Fig. 4 is a longitudinal section through a change speed gearing for four speeds. Fig. 5 is a cross section on line 5 5 of Fig. 4. Fig. 6 is a longitudinal section of part of the structure illustrated in Figs. 4 and 5 illustrating the connection of certain of the gears and their controlling rod. Fig. 7 is a longitudinal section through a gearing having three speeds. Fig. 8 is a cross section on line 8 8 of Fig. 7. Figs. 9 and 10 are respectively a transverse vertical section and a sectional plan drawn to an enlarged scale of the arrangement for locking the operating rods of the speed reducing gears.

Referring to Figs. 1, 2 and 3, the motor shaft A is journaled on the one hand in a double ball bearing $a$ $a$ and on the other hand in a long bronze bush $b$ fitted in a socket in the shaft B which transmits the movement. The shaft B is also journaled in a double ball bearing. The gear wheel D is in one piece with the shaft B. It is provided with internal teeth $d$. The double pinion E can slide on the motor shaft A for which purpose the latter is fitted with keys $e$. When directly connected with gear D the driven shaft B is driven at maximum speed. The gear wheel F is also mounted on the shaft A but is free to turn thereon; it has internal teeth $f$. The internal teeth $d$ and $f$ are adapted to engage with the teeth of the double pinion E. The intermediate shaft C carries keyed to it two pinions G and H which are respectively in constant engagement with the wheels D and F. The pinion I is free on the shaft C and can slide thereon while being continually in engagement with the pinion E. The pinion I has internal teeth $i$ adapted to engage with the pinion H. When driven through pinion I driven shaft B is driven at the second speed, lower than that of the direct connection. The third shaft J situated below those above mentioned and shown separately in Fig. 3 carries two pinions K and M which turn with it. Pinion K is always engaged with the wheel D and pinion M engages with the wheel I when the latter is suitably displaced. In this manner backward running is obtained. The internal teeth $d$, $f$, $i$ of the wheels D, F, I, which are adapted to engage with the teeth of the pinions E and H respectively, are substituted for the clutch couplings commonly used; but this latter mode of coupling may also be used if desired. The double pinion E is displaced on its shaft A by means of an operating rod N which carries an arm $g$ having at its end a fork $h$ engaging in the groove $j$ formed in the pinion E. The pinion I has a groove $k$ in which engages the fork $m$ of an arm $n$ carried by a second operating rod $N^1$.

The mechanism operates as follows: By shifting the double pinion E on the shaft so that its teeth engage with the internal teeth of wheel D the shafts A and B are coupled together and turn at the same speed. By shifting the pinion E in the other direction so as to engage its teeth with the internal teeth $f$ of the wheel F the shaft B is driven through the wheel H, shaft C, wheel G and wheel D: this is the second speed. By moving the pinion E to its middle position in which it is disengaged from both wheels D and F, and by moving the pinion I so as to engage its internal teeth $i$ with the teeth of the wheel H, the first speed is obtained, for the movement of the shaft A is transmitted to the shaft B through the pinion E, the pinion I, the wheel H, the shaft C, the wheel G and wheel D. The reverse movement of the pinion I brings its external teeth into engagement with the pinion M mounted on the shaft J, and the pinion K mounted on the same shaft, J, transmits the movement to the wheel D: the shaft B then turns in the opposite direction to that of the shaft A: this is backward running. The mechanism for four speeds (Figs. 4, 5 and 6) comprises also a double pinion E mounted to slide on the motor shaft A. This pinion E is of two diameters so as to obtain one more speed than in the mechanism above described. Correspondingly the freely mounted pinion on the shaft C is also of two diameters and consists of two pinions I I$^1$ of different diameters and in contact with each other but turning independently of each other. The speed transmitted therefore depends on which of these pinions I I$^1$ is rendered fast to the shaft C. The pinions I I$^1$ are displaced axially on the intermediate shaft C by a double fork S carried by an operating rod T but, as already stated, the pinions can turn independently of each other. The higher speed is obtained as above described by the direct locking of the motor shaft A to the shaft B by shifting the pinion E until it engages with the internal teeth $d$ of the wheel D. The third speed is obtained by engaging the pinion E with the internal teeth $f$ of the wheel F, the movement being transmitted through the wheel H, the shaft C and the wheels G and D. When the shafts A and B are locked together or when the mechanism is running on the third speed the pinions I, I$^1$ are disengaged from the toothed wheels H and G. For running on the second speed the two pinions I, I$^1$ are slid toward the wheel H so as to engage the internal teeth $i$ of the pinion I with the teeth of the wheel H. The movement is then transmitted from E through I, H, C, G and D. If the pinions I, I$^1$ are shifted toward the left the internal teeth $i^1$ of the pinion I$^1$ are engaged with the teeth of the wheel G so that the movement is transmitted from E, I$^1$, G and D. This is the first speed and is the slowest. In this construction shown in Figs. 4 and 5 the backward running is obtained through the pinions M and K which are fastened to each other and rotate on the shaft J. These pinions are shifted by a fork V carried by a rod U. In normal running these pinions M and K are out of mesh with the other wheels and are therefore at rest. When they are shifted by the fork V so as to bring them respectively into engagement with the pinion I and the wheel D the movement is transmitted through E, I$^1$ and D in the reverse direction. The rod T which carries the double fork S for the pinions I, I$^1$, the rod U which carries the fork V for the pinions M and K and the rod R which carries the fork Q of the pinion E are all operated by a single rod Y controlled by the driver: this rod serves to operate one or another of the three forks as will be understood by inspection of Fig. 5.

In the construction shown in Figs. 7 and 8 in which there are three speeds, as shown in Figs. 1 and 2, the pinion K for backward running is not constantly engaged with the wheel D as was the case in the said Figs. 1 and 2, but is only so engaged when backward running is required. The connected pinions M and K constitute a speed-reducing pinion mounted on the third shaft J. The speed obtained is lower than either of the forward speeds. For backward running the pinion I is displaced on the shaft C to bring it into mesh with the pinion M which has a flange $m$ on one face of it. The teeth of the pinion I engage this flange so that the pinion carries the pinions M and K with it until the last named pinion engages with the wheel D. The pinions are operated by means of the rods N and N$^1$ which are locked in their middle positions and at each of the positions corresponding with the several speeds by a ball $q$ pressed by a spring $r$ and adapted to engage in recesses $s$ on the peripheries of the operating rods. A safety lock independent of the locking just described prevents with certainty any movement of the rod which is not being used. This safety lock, which is shown in Fig. 2 and in detail in Figs. 9 and 10, consists of a steel cylinder $o$ rounded at each end and adapted to slide in its bearing. These rounded ends are adapted to engage in corresponding recesses $p$, $p^1$ in the periphery of the rods N, N$^1$ respectively when the rod is in its middle position. When one of the rods is moved from the middle position it pushes the piece $o$ into the recess of the other rod which is therefore locked, the length of the piece $o$ being so adjusted that the one rod can be moved freely while the other is locked. Fig. 10 shows one of the rods locked in the middle position and the other capable of free movement. All the change speed mechanism is immersed in a bath of oil contained in a tight casing. The mechanism shown applies to vehicles driven without a chain. When a chain drive is used the arrangement of the mechanism is the same, the differential gearing being arranged in the same casing and driven by a couple of bevel gear wheels as in existing mechanism.

In the construction described already the speed-reducing pinion F is carried by the motor shaft and the gearing transmits the movement of this shaft to a transmitting shaft. Precisely the same mechanism will suffice if the said speed-reducing pinion F is carried by the transmitting shaft instead of by the motor shaft; the variations of speed and the backward running would then be secured in the manner already described. It may be added that this change speed gearing is of very small dimensions so that it is advantageously applied to motor cars in situations where it is not possible to place the existing change speed gearing. Thus the change speed gearing can be advantageously applied or situated on the rear axle of the vehicle combining it with the differential gearing, a single casing serving to contain and support the two mechanisms.

Having thus described our invention and the best means we know of carrying the same into practical effect, we claim:

1. A change speed gearing including a plurality of shafts and a plurality of gears on said shafts, one of which gears is a rotatively fast driving pinion, and other of which gears are rotatively fast and loose respectively, each loose gear being continuously in mesh with a rotatively fast gear on another shaft, each loose gear being also adjacent a rotatively fast gear on the same shaft, there being relative longitudinal movement between said adjacent gears, whereby they may be brought longitudinally into engagement to transmit motion.

2. A change speed gearing including a plurality of shafts and a plurality of gears on said shafts, one of which gears is a longitudinally movable rotatively fast driving pinion, and other of which gears are rotatively fast and loose respectively, each loose gear being continuously in mesh with a rotatively fast gear on another shaft, each loose gear being also adjacent a rotatively fast gear on the same shaft, there being relative longitudinal movement between said adjacent gears, whereby they may be brought longitudinally into engagement to transmit motion.

3. A change speed gearing including a plurality of shafts and a plurality of gears on said shafts, one of which gears is a longitudinally movable rotatively fast driving pinion, and other of which gears are rotatively fast and loose respectively, each loose gear being continuously in mesh with a rotatively fast gear on another shaft, each loose gear being also adjacent a rotatively fast gear on the same shaft, there being relative longitudinal movement between said adjacent gears, whereby they may be brought longitudinally into engagement to transmit motion, and a driven pinion in line with said driving pinion and with which said driving pinion is adapted to be moved longitudinally into engagement.

4. A change speed gearing including a driving shaft, a driven shaft and a counter-shaft, a driven pinion connected with said driven shaft, a driving pinion connected with said driving shaft and movable into and out of engagement with said driven pinion and a pinion upon said counter-shaft in mesh with said driven pinion, loose intermediate gears upon said counter-shaft always in mesh with said driving pinion, and means for connecting said intermediate gears to said counter-shaft whereby motion is transmitted from said driving pinion and shaft to said driven pinion and shaft.

5. A change speed gearing including a plurality of shafts, a driving pinion on one of said shafts, intermediate gears loose upon a plurality of said shafts, fixed gears upon a plurality of said shafts, said pinion and gears upon one shaft being in mesh with those on another, said pinion and gears also having interengaging means whereby the fast and loose members upon each shaft may be brought into engagement with one another to transmit motion.

6. A change speed gearing including a plurality of shafts, a driving pinion on one of said shafts, intermediate gears loose upon a plurality of said shafts, fixed gears upon a plurality of said shafts, said pinion and gears upon one shaft being in mesh with those on another, said pinion and gears also having interengaging means whereby the fast and loose members upon each shaft may be brought into engagement with one another to transmit motion, said driving pinion also being adapted to be connected directly to a shaft to transmit motion.

7. A change speed gearing including a plurality of shafts, a driving pinion on one of said shafts, intermediate gears loose upon a plurality of said shafts, fixed gears upon a plurality of said shafts, said pinion and gears upon one shaft being in mesh with those on another, said pinion and gears also having interengaging means whereby the fast and loose members upon each shaft may be brought into engagement with one another to transmit motion, and gears for transmitting reverse motion adapted to be connected to one of said gears.

8. A change speed gearing including a plurality of shafts, a driving pinion slidably mounted on one of said shafts, a driven pinion, loose intermediate gears mounted on one or more of said shafts, some of which gears are slidably mounted, fixed gears on a plurality of said shafts, one of which gears meshes with said driven pinion, said gears and pinions on the different shafts being always in mesh, clutching means upon said gears and pinions, and means for moving said slidable gears and pinions into clutching engagement with said other gears and pinions.

9. A change speed gearing including a plurality of shafts, a driving pinion slidably mounted on one of said shafts, a driven pinion mounted upon a shaft in alinement with the shaft of said driving pinion, loose intermediate gears mounted on one or more of said shafts, some of which gears are slidably mounted, fixed gears on a plurality of said shafts, one of which gears meshes with said driven pinion, said gears and pinions on the different shafts being always in mesh, clutching means upon said gears and pinions, and means for moving said slidable gears and pinions into clutching engagement with said other gears and pinions.

10. A change speed gearing including a plurality of shafts, a driving pinion slidably mounted on one of said shafts, a driven pinion, loose intermediate gears mounted on one or more of said shafts, some of which gears are slidably mounted, fixed gears on a plurality of said shafts one of which gears meshes with said driven pinion, said gears and pinions on the different shafts being always in mesh, clutching means upon said gears and pinions, and means for moving said slidable gears and pinions into clutching engagement with said other gears and pinions, said means comprising a plurality of operating-rods having operating arms engaging said slidable pinions and gears, and means preventing operation of more than one rod at a time.

11. A change speed gearing including a plurality of shafts, a driving pinion slidably mounted on one of said shafts, a driven pinion, loose intermediate gears mounted on one or more of said shafts, some of which gears are slidably mounted, fixed gears on a plurality of said shafts, one of which gears meshes with said driven pinion, said gears and pinions on the different shafts being always in mesh, clutching means upon said gears and pinions, and means for moving said slidable gears and pinions into clutching engagement with said other gears and pinions, said means comprising a plurality of operating-rods having operating arms engaging said slidable pinions and gears, means retaining said rods in operated position, and means preventing operation of more than one rod at a time.

12. A change speed gearing including a plurality of shafts, a driving pinion slidably mounted on one of said shafts, a driven pinion, loose intermediate gears mounted on one or more of said shafts, some of which gears are slidably mounted, fixed gears on a plurality of said shafts, one of which gears meshes with said driven pinion, said gears and pinions on the different shafts being always in mesh, clutching means upon said gears and pinions, and means for moving said slidable gears and pinions into clutching engagement with said other gears and pinions, said means comprising a plurality of operating-rods having operating arms engaging said slidable pinions and gears, and means permitting only such movements of the rods as will secure proper engagements of the pinions and gears.

13. A change speed gearing including a plurality of shafts, a driving pinion slidably mounted on one of said shafts, a driven pinion, loose intermediate gears mounted on one or more of said shafts, some of which gears are slidably mounted, fixed gears on a plurality of said shafts one of which gears meshes with said driven pinion, said gears and pinions on the different shafts being always in mesh, clutching means upon said gears and pinions, and means for moving said slidable gears and pinions into clutching engagement with said other gears and pinions, said means comprising a plurality of operating rods having operating arms engaging said slidable pinions and gears, and having notches therein, a bolt between said rods, adapted to engage within said notches and adapted to permit operation of a rod only when engaged in the notch of another rod.

14. A change speed gearing comprising a driven shaft two parallel shafts, one of which is a driving shaft in alinement with said driven shaft while the other is an intermediate shaft, a pinion on said driving shaft adapted to turn therewith but to slide thereon, an intermediate gear on said intermediate shaft adapted to move freely thereon, said pinion and gear being always in engagement with each other, means adapted for shifting said pinion and gear axially on said shafts, and gear wheels adapted to engage with said pinions and gear when shifted so as to transmit the movement of the driving shaft to said driven shaft directly, or at either of a plurality of speeds.

15. A change speed gearing comprising a driving shaft and a driven shaft in alinement therewith, a gear having internal and external teeth fixed to said driven shaft, a pinion adapted to slide upon and to turn with the said driving shaft, means for shifting said pinion into engagement with the internal teeth of said gear, an intermediate shaft, a toothed gear keyed to said intermediate shaft and always in engagement with the external teeth of said driven shaft gear, loose intermediate gears always in engagement with said pinion on the driving shaft, and means for connecting said intermediate gears with said gear keyed upon said intermediate shaft for driving said driven shaft.

16. A change speed gearing comprising a driving shaft, a pinion adapted to slide on said shaft and to turn therewith, an intermediate gear having internal and external teeth mounted free to turn on the said driving shaft, an intermediate shaft, intermediate gears upon said intermediate shaft, always in mesh with said pinion on the driving shaft, fixed gears upon said intermediate shaft adjacent said intermediate gears, one of said fixed gears meshing with the intermediate gears on said driving shaft, a driven shaft, means for connecting said intermediate gears to a fixed gear, and means for connecting said driven shaft to a fixed gear on said intermediate shaft to transmit motion.

17. A change speed gearing comprising a driving shaft, an intermediate shaft, a pinion adapted to slide on the driving shaft, an intermediate gear having internal and external teeth mounted to turn freely on the intermediate shaft and adapted to engage continuously with the first named pinion, a gear keyed to said intermediate shaft, and adapted to be engaged by said intermediate gear, a driven shaft having a gear thereon in engagement with said fixed gear upon the intermediate shaft, and means for connecting said intermediate gear to said fixed gear for transmitting motion to the driven shaft.

18. A change speed gearing comprising a driving shaft, a driving pinion keyed to the said driving shaft, an intermediate shaft, fixed gears upon said intermediate shaft, intermediate gears mounted free on the said intermediate shaft, always in gear with said driving pinion, a driven shaft, a driven pinion upon said driven shaft in engagement with one of the fixed gears on said intermediate shaft, said intermediate gears being adapted to engage said fixed gears on said intermediate shaft, whereby different speeds may be transmitted from said driving shaft to said driven shaft by said intermediate gears.

19. A change speed gearing including a driving shaft, a driven shaft, a driving pinion mounted upon said driving shaft, a counter-shaft, a pinion loosely mounted on said counter-shaft, said pinions being always in mesh, and means for connecting said pinions to the driven shaft.

20. A change speed gearing including in combination a driving shaft, a pinion keyed to said shaft, a counter-shaft, a pinion loosely mounted on said counter-shaft and always in engagement with said pinion on said driving shaft, a gear fixed to said counter-shaft, said loosely mounted pinion and said gear upon said counter-shaft being adapted to be connected together, a driven shaft, and means for communicating the movement of said counter-shaft to said driven shaft.

21. A change speed gearing including a plurality of shafts, a driving pinion slidably mounted on one of said shafts, a driven pinion, loose intermediate gears mounted on one or more of said shafts, some of which gears are slidably mounted, fixed pinions on a plurality of said shafts, one of which pinions meshes with said driven pinion, said gears and pinions on the different shafts being always in mesh, clutching means upon said gears and pinions, and means for moving said slidable gears and pinions into clutching engagement with said other gears and pinions, said means comprising a plurality of operating-rods having operating arms engaging said slidable pinions and gears.

22. A change speed gearing comprising a driven shaft two parallel shafts, one of which is a driving shaft in alinement with said driven shaft while the other is an intermediate shaft, a pinion on said driving shaft adapted to turn therewith but to slide thereon, an intermediate gear on said intermediate shaft adapted to move freely thereon, said pinion and gear being always in engagement with each other, means adapted for shifting said pinion and gear axially on said shafts, and gear wheels adapted to engage with said pinion and gear when shifted so as to transmit the movement of the driving shaft to said driven shaft directly, or at either of a plurality of speeds, and gears for transmitting reverse motion adapted to be connected to one of said intermediate gears.

23. A change speed gearing, including two parallel shafts, one of which has a pinion keyed thereto and the other of which has loose and fixed gears thereon, the loose gear of which is always in engagement with said pinion on the other shaft, said gears having interengaging means, whereby said loose gear is adapted to be brought into clutching engagement with a fixed gear.

24. A transmission gearing comprising parallel shafts, a driving member connected to one of said shafts to turn the same, a pair of gears on each shaft, the gears of each pair being connected to move together longitudinally of their shafts, the gears of one pair on one shaft being in constant engagement with the gears of the other pair on the other shaft, and the gears of one of the pairs being arranged to turn independently of each other, connecting devices operatively engaged by the longitudinal movement of the pairs of gears, and means for shifting each pair of gears independently of the other.

25. A transmission gearing comprising a driving member, a driven shaft in axial alinement with the driving member, a counter shaft, gears operatively attached to the driven shaft to turn therewith and movable longitudinally thereof, clutch members carried by one of said gears to engage the driving member and connect said driving member with the driven shaft, means for transmitting motion from the driving member to the counter shaft, gears on the counter shaft connected together to move longitudinally thereon and free to turn independently of each other upon said shaft, said gears being in constant engagement with the gears on the driven shaft, a clutch near each end of the counter shaft to separately connect the gears on the counter shaft to said shaft when said gears are moved longitudinally into engagement therewith, means for simultaneously moving the gears on the driven shaft, and separate means for simultaneously moving the gears on the counter shaft.

In witness whereof, we have hereunto signed our names in the presence of two subscribing witnesses.

FRÉDÉRIC JEAN-BAPTISTE DAMAIZIN.
JEAN PUJOS.

Witnesses:
H. C. COXE,
CHARLES MARDELET.

Copies of this patent may be obtained for five cents each, by addressing the "Commissioner of Patents, Washington, D. C."